(12) United States Patent
Ram et al.

(10) Patent No.: US 8,706,095 B2
(45) Date of Patent: Apr. 22, 2014

(54) SYSTEM FOR PROVIDING DYNAMIC GROUP AND SERVICE ASSIGNMENTS

(75) Inventors: Satish N. Ram, Poway, CA (US); Robert D. McCloskey, Lawrenceville, GA (US); Loyle H. Sims, III, Valley Center, CA (US)

(73) Assignee: Omnitracs, LLC, San Diego, CA (US)

( * ) Notice: Subject to any disclaimer, the term of this patent is extended or adjusted under 35 U.S.C. 154(b) by 1333 days.

(21) Appl. No.: 11/097,664

(22) Filed: Apr. 1, 2005

(65) Prior Publication Data

US 2006/0223525 A1     Oct. 5, 2006

(51) Int. Cl.
*H04M 3/42* (2006.01)

(52) U.S. Cl.
USPC ........ 455/414.2; 701/30; 701/33.2; 701/34.2; 701/34.3; 701/34.4; 701/29.1; 455/425; 455/456; 455/423

(58) Field of Classification Search
USPC ............. 455/425, 456.1, 456.5, 456.6, 414.2, 455/456.3, 423; 701/29, 30, 33.2, 34.2, 701/34.3, 34.4, 29.1
See application file for complete search history.

(56) References Cited

U.S. PATENT DOCUMENTS 5,561,704 A * 10/1996 Salimando ................. 455/456.5
6,983,200 B2 * 1/2006 Bodin et al. ..................... 701/33
7,457,614 B2 * 11/2008 Dasti et al. ................. 455/414.1
2003/0013449 A1 * 1/2003 Hose et al. ..................... 455/440
2003/0186710 A1 * 10/2003 Muhonen et al. .......... 455/456.5
2004/0116132 A1 * 6/2004 Hunzinger et al. ........ 455/456.1
2006/0195365 A1 * 8/2006 Karabetsos ..................... 705/26

FOREIGN PATENT DOCUMENTS

WO          0150788 A1     7/2001

OTHER PUBLICATIONS

International Search Report, PCT/US06/011746, International Search Authority, European Patent Office, Aug. 22, 2008.
Written Opinion, PCT/US06/011746, International Search Authority, European Patent Office, Aug. 22, 2008.
International Preliminary Report on Patentability, PCT/US06/011746, The International Bureau of WIPO, Geneva Switzerland, Sep. 23, 2008.

* cited by examiner

*Primary Examiner* — Patrick Edouard
*Assistant Examiner* — Shantell L Heiber
(74) *Attorney, Agent, or Firm* — Arent Fox LLP

(57) ABSTRACT

System for providing dynamic group and service assignments. In one embodiment, a method is provided for dynamically assigning regional groups and service providers to provide services for equipment. The method includes determining that the equipment has moved into a selected regional group, and assigning the equipment to the selected regional group. The method also includes selecting a service provider associated with the selected regional group, and assigning the service provider to provide services for the equipment.

33 Claims, 3 Drawing Sheets

SYSTEM FOR PROVIDING DYNAMIC GROUP AND SERVICE ASSIGNMENTS

BACKGROUND

I. Field

The present invention relates generally to the use, service, and maintenance of industrial machinery and heavy equipment, and more particularly, to a system for dynamically assigning regional groups and service providers to service industrial machinery and heavy equipment.

II. Description of the Related Art

Advances in technology have provided for increased sophistication in the construction and heavy equipment industries. For example, many types of industrial equipment now include computers, wireless transceivers, positioning equipment and other sophisticated electronics. With the increase in sophistication comes a corresponding increase in equipment service and maintenance requirements. For example, most heavy equipment requires periodic maintenance after a predetermined number of usage hours. Thus, providing efficient service and maintenance has become an important goal for construction companies, leasing agencies, purchasers, and others in the heavy equipment industry.

Typically, heavy equipment is moved from job site to job site as needed with periodic or scheduled maintenance performed to minimize down time. Minor maintenance may be performed at the job site, while more complicated services may require that the equipment be moved to an authorized service station. Thus, it has become convenient to assign one or more administrative agencies, maintenance or service providers in a particular geographic region to be responsible to maintain and repair equipment in the region. Unfortunately, this arrangement doesn't work very well when the equipment is moved outside the region. For example, due to cost or logistical reasons, the equipment may be moved to a job site outside its current operating region.

Once the equipment is moved outside its current region, arranging for service and maintenance becomes a problem. Typically, the equipment is assigned to a service provider in a particular region who is responsible for providing maintenance and repairs for the equipment. The service provider generates reports (i.e., weekly or monthly) that list equipment it is responsible for and scheduled maintenance or service that may be due. When the service provider discovers that a particular piece of equipment needs maintenance or service, it locates the equipment and provides field service, or arranges for the equipment to be taken to a repair center in the region. However, if the equipment has been moved into another region, it may be difficult or very costly to get service personnel to the equipment, or to return the equipment to the repair center located in its original operating region. To overcome these problems, a service provider in the region in which the equipment is currently located may be contacted to service the equipment. For example, personnel at the original service provider view monthly reports about equipment for which they are responsible. If it is determine that a piece of equipment needs maintenance and is located outside its originally assigned region, then the personnel at the original service provider may call a service provider associated with the new region and arrange for that service provider to provided the required services to the equipment.

Unfortunately, having to arrange for service in another region is inconvenient, expensive, and may result in one or more other problems. For example, the service provider in the new region may fail to provide the required services. Alternatively, the responsibility for the equipment may be completely transferred to the service provider in the new region. This requires that the service personnel at the original service provider manually transfer (i.e., fill out forms, update computers, etc.) responsibility for the equipment to the new provider. In addition, the appropriate administrative groups (i.e., accounting) may also have to be notified. This may result in more problems because the transfer may be done incorrectly or appropriate groups may not be notified, and in the confusion the equipment may be assigned to multiple service providers in different regions.

Therefore, what is needed is a system that operates to dynamically assign equipment to regional groups and one or more service providers to provide services for equipment as it is moved from region to region. Such a system should also be able to dynamically un-assign groups and service providers as the equipment is moved outside of a particular region.

SUMMARY

In one or more embodiments, a dynamic assignment system comprising methods and apparatus is provided to dynamically assign groups and service responsibilities for industrial equipment. For example, in one embodiment, the system operates to dynamically assign service responsibilities for industrial equipment to one or more service providers based on the location of the equipment. As a result, the system allows equipment to be efficiently maintained as it moves from region to region while eliminating confusion about what entity is responsible for servicing the equipment.

In one embodiment, a method is provided for dynamically assigning regional groups and service providers to provide services for equipment. The method comprises determining that the equipment has moved into a selected regional group, and assigning the equipment to the selected regional group. The method also comprises selecting a service provider associated with the selected regional group, and assigning the service provider to provide services for the equipment.

In another embodiment, apparatus is provided for dynamically assigning regional groups and service providers to provide services for equipment. The apparatus comprises transceiver logic that operates to determine that the equipment has moved into a selected regional group, and database logic that operates to select a service provider associated with the selected regional group. The apparatus also comprises processing logic that operates to assign the equipment to the selected regional group, and assign the service provider to provide services for the equipment.

In another embodiment, apparatus is provided for dynamically assigning regional groups and service providers to provide services for equipment. The apparatus comprises means for determining that the equipment has moved into a selected regional group, and means for assigning the equipment to the selected regional group. The apparatus also comprises means for selecting a service provider associated with the selected regional group, and means for assigning the service provider to provide services for the equipment.

In another embodiment, a signal-bearing medium is provided that tangibly embodies a program of machine-readable instructions executable by a digital processing apparatus to perform a method for dynamically assigning regional groups and service providers to provide services for equipment. The method comprises operations of determining that the equipment has moved into a selected regional group, and assigning the equipment to the selected regional group. The method also comprises operations of selecting a service provider associated with the selected regional group, and assigning the service provider to provide services for the equipment.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes a dynamic assignment system that operates to dynamically assign service responsibilities for industrial equipment. In one embodiment, the equipment includes communication logic that allows the equipment to communicate its location to a central station using a wireless communication channel.

It should be understood that the described assignment system could be used in conjunction with virtually any type of equipment including, but not limited to, industrial equipment, such as cement trucks, backhoes, or bulldozers, and/or any other type of equipment or vehicle, such as buses, trains, automobiles, and/or watercraft.

Figure 1:
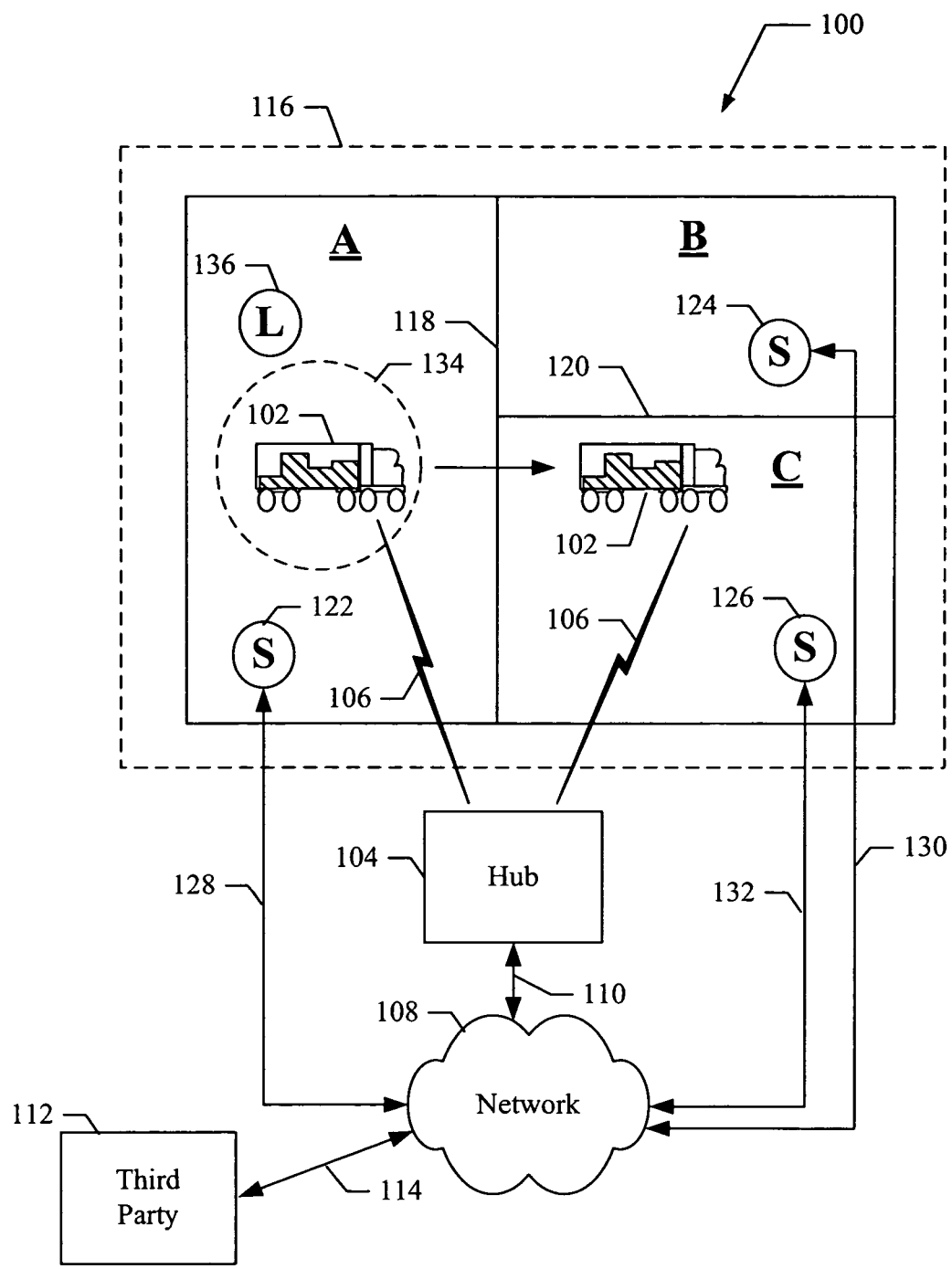
FIG. 1 shows one embodiment of dynamic assignment system.

FIG. 1 shows one embodiment of dynamic assignment system 100 that operates to dynamically assign service responsibilities for industrial equipment. The equipment in this example comprises equipment 102 that is in communication with a central station or "hub" 104. For example, the equipment 102 communicates with the hub 104 using communication link 106. In one embodiment, the equipment 102 comprises a mobile communication terminal (MCT) (not shown) for communicating with the hub 104 using a terrestrial-based wireless communication link. However, the link 106 may comprise any suitable wired or wireless communication link, such as a satellite link, terrestrial link, radio link, network link, telephone link, or any other type of communication link. The equipment 102 also comprises positioning logic (i.e., GPS) that allows the equipment 102 to determine its current position. As a result, the equipment 102 is able to transmit its current position to the hub 104 using the communication link 106. It should also be noted that the hub 104 may be in communication with virtually any type and/or number of pieces of equipment and that embodiments of the assignment system 100 are suitable for use with little or only minor modifications.

In one embodiment, the hub 104 communicates with a communication network 108 via communication link 110. The network 108 may comprise any type or combination of wired and/or wireless networks that allow information to be communicated between the hub 104 and other network entities. The link 110 comprises any suitable communication link. In one embodiment a third-party 112 communicates with the network 108 via the communication link 114. The third-party 112 may comprise any administrative office, accounting, dispatch center, leasing company, rental agency, or customer, and the communication link 114 may comprise any suitable wired and/or wireless communication link.

For the purpose of this description it will be assumed that the equipment 102 operates in a geographic region 116. In one embodiment, the system operates to divide the geographic region 116 into three operating regional groups (A, B, and C) that define any suitable area, job site, county, state, or any other type or size region. The geographic regions are separated by boundaries 118 and 120. For example, the boundary 118 separates the regional group A from the regional groups B and C. The boundary 120 separates the regional group B from the regional group C. In one embodiment, each region includes a service provider (S) that operates to maintain and service equipment within that region. For example, the regional group A includes service provider 122, the regional group B includes service provider 124, and the regional group C includes service provider 126. Each of the service providers communicates with the network 108 via wired and/or wireless communication links, 128, 130, and 132, respectively.

During operation of one or more embodiments, the dynamic assignment system 100 operates to dynamically assign regional groups and service responsibilities to one or more service providers (S) as the equipment 102 moves between operating regions. For example, it will be assumed that the equipment 102 is initially located in regional group A and that the service provider 122 is assigned to provide service and maintenance to equipment 102. It will also be assumed that the equipment 102 communicates its position and/or other vehicle status to the hub 104 via the link 106. As the equipment 102 moves into regional group C, it communicates its new position to the hub 104 via the link 106. The hub 104 determines from the position information that the equipment 102 has moved into regional group C. Because the equipment 102 is now in regional group C, the hub 104 assigns equipment 102 to regional group C and determines that it would be more efficient to assign service provider 126 to provide service and maintenance to the equipment 102. The hub 104 then transmits assignment information to the service provider 126 that informs the service provider 126 to assume service and maintenance for the equipment 102. For example, the assignment information includes equipment identifiers, equipment position indicators, operator identifiers, and any other suitable information. The assignment information is transmitted via the network 108 and link 132. Additionally, the hub 104 may also transmit un-assignment information to the service provider 122 via the network 108 and the link 128. The un-assignment information un-assigns the equipment from its previous regional group and informs the associated service provider 122 that it is no longer responsible for the service and maintenance of the equipment 102. Furthermore, the hub 104 may notify the third-party 112 about the service provider assignments, or the third party 112 may receive information from any or all of the service providers regarding their current equipment responsibilities.

As the equipment 102 moves from region to region, the hub 104 operates to assign equipment to regional group and service providers associated with the region in which the equipment 102 is currently located. The hub 104 also operates to un-assign equipment from the previous regional group and the service provider in the region that the equipment has left. Thus, the dynamic assignment system operates to monitor the location of the equipment 102 and assign regional groups and service providers that can provide the most cost effective and efficient service and maintenance.

In another embodiment, the equipment may be associated with a parameter that indicates whether the equipment should be statically or dynamically assigned to a regional group and service provider. For example, if the parameter indicates that the equipment should be statically assigned, then once a service provider is assigned to provide services for the equipment, that provider remains the same whether or not the equipment leaves its current operating region. If the parameter indicates that the equipment should be dynamically assigned, then service providers will be dynamically assigned to provide services to the equipment as it moves from operating region to operating region as the equipment gets assigned to different regional groups.

In one embodiment, the equipment 102 transmits its current position to the hub 104 at scheduled or random intervals. In another embodiment, the equipment 102 transmits its current position as the result of a trigger event. For example, in one embodiment, a virtual fence 134 is placed around the equipment 102 when it is at a particular location or job site. The virtual fence 134 represents a virtual geographic boundary that surrounds the equipment 102. In one embodiment, systems within the equipment 102 create and monitor the virtual fence 134. When the equipment 102 is within this geographic boundary, it either does not transmit its current position, or infrequently transmits its position to the hub 104. When the equipment 102 is moved across the virtual geographic boundary, this constitutes a trigger event that causes the equipment 102 to transmit its position to the hub 104 more frequently. Thus, the trigger event of breaking the boundary of the virtual fence 134 causes the equipment 102 to transmit its position or other status information. In another embodiment, other trigger events may include vehicle status, engine hours, or engine parameters such as engine temperature or oil pressure.

In one embodiment, the system provides for advance reporting and mapping functionality that is not generally available in conventional systems. For example, the system allows a geographic map to be constructed showing all equipment in an operating region for which a particular service provider is responsible. The system also allows geographic maps to be constructed showing the proximity of the equipment in an operating region to a particular landmark. For example, a landmark 136 is shown in regional group A. The landmark 136 represents a geographic position of a job site, fuel station, or any other point of interest. The system operates to allow a map to be constructed showing the proximity of any or all of the equipment in regional group A to the landmark 136. Thus, the system provides enhanced reporting and mapping functionality over conventional systems, thereby allowing for greater efficiency and cost savings as it becomes much easier to route equipment from region to region or to specific landmarks.

Figure 2:
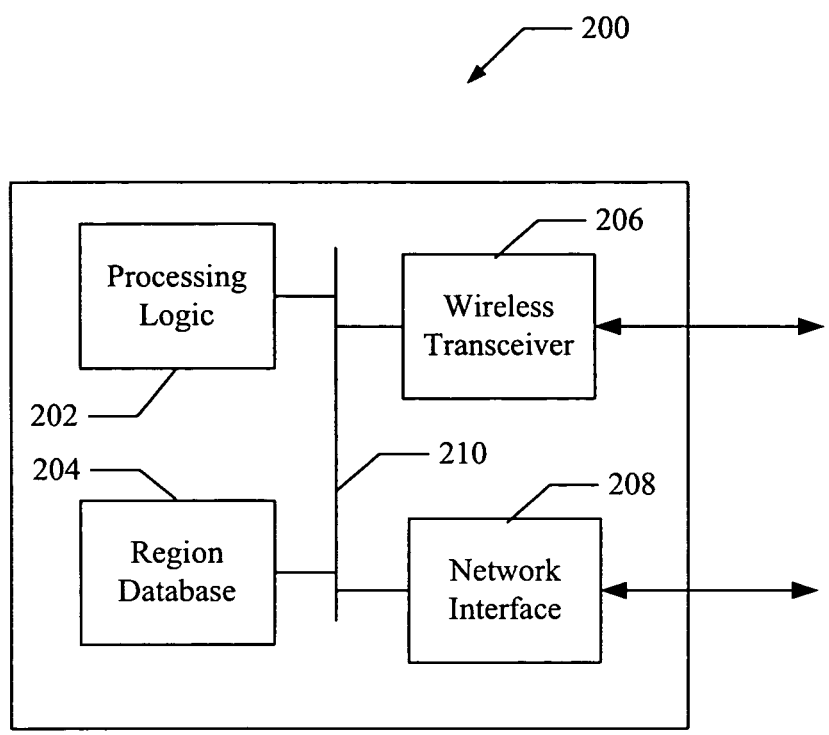
FIG. 2 shows one embodiment of a hub for use in one or more embodiments of a dynamic assignment system.

FIG. 2 shows one embodiment of a hub 200 for use in one or more embodiments of a dynamic assignment system. For example, the hub 200 is suitable for use as the hub 104 shown in FIG. 1. The hub 200 comprises processing logic 202, region database 204, wireless transceiver 206 and network interface 208 all coupled to an internal bus 210.

The processing logic 202 comprises a processor, CPU, gate array, logic, discrete circuitry, software, or any combination of hardware and software. The processing logic 202 operates to process equipment position information received from equipment in the field to dynamically associate regional group and service providers to provide service and maintenance to the equipment.

The wireless transceiver 206 comprises a processor, CPU, gate array, logic, discrete circuitry, software, or any combination of hardware and software. The wireless transceiver 206 operates to receive information transmitted from equipment in the field. For example, equipment in the field, such as trucks, bulldozers, or other type of industrial equipment, communicate their position information to the wireless transceiver 206. In one embodiment, the transceiver 206 receives transmissions over terrestrial communication links, however, in other embodiments, the transceiver logic 206 may receive transmission over any suitable type of transmission link.

The region database 204 comprises a database stored in any suitable memory that defines geographic regions and associates those regions with service providers. For example, each region identified in the database 204 has one or more associated service providers that operate in that region to provide services and maintenance to equipment in that region. The database 204 also identifies equipment currently located in each region and to which regional group and service provider the equipment is assigned. In one embodiment, the information in the database 204 may be accessed and/or modified by the processing logic 202 so that regions, equipment, and associated assignments may be updated and/or modified.

The network interface 208 comprises a processor, CPU, gate array, logic, discrete circuitry, software, or any combination of hardware and software. The network interface operates to transmit and receive communications over a data network. For example, the network interface 208 allows the hub 200 to communicate over the Internet. In one embodiment, the network interface 208 allows the processing logic 202 to communication with service providers in one or more geographic regions using the Internet. For example, the processing logic 202 transmits assignment information to the service providers using the network interface 208, so that equipment may be assigned to a particular service provider for service and maintenance. In another embodiment, the processing logic 202 operates to transmit un-assignment information so that equipment may be unassigned from one or more regional groups and service providers.

In one embodiment, the dynamic assignment system comprises a signal-bearing medium tangibly embodying a program of machine-readable instructions executable by a digital processing apparatus which when executed by the hub 200 provide the functions as described herein. For example, instructions may be loaded into the processing logic 202 from a computer-readable media, such as a floppy disk, CDROM, memory card, FLASH memory device, RAM, ROM, or any other type of memory device or computer-readable media that interfaces to the processing logic 202. In another embodiment, the instructions may be downloaded into the processing logic 202 from a network resource via the network interface 208. The instructions, when executed by the processing logic 202, provide one or more embodiments of a dynamic assignment system as described herein.

During operation of one or more embodiments of the dynamic assignment system, one or more of the following functions are performed.

1. Define one or more geographic regions in which equipment will operate.
2. Associate one or more service providers with each region.
3. Assign equipment located in each region with the appropriate regional group and service provider.
4. Monitor the position of the equipment.
5. Determine when equipment moves to a new region.
6. Assign the moved equipment to the new regional group and a service provider that operates in the new region.
7. Un-assign the moved equipment from its prior regional group and service provider.
8. Inform third parties of the new assignments if necessary.

It should be understood that the elements of the hub 200 shown in FIG. 2 represent just one embodiment, and that implementation of the hub 200 could be achieved in any number of ways using greater, fewer, or different functional elements. For example, the functions of the processing logic 202 and database 204 could be implemented in a computer program executed by one or more processors.

Figure 3:
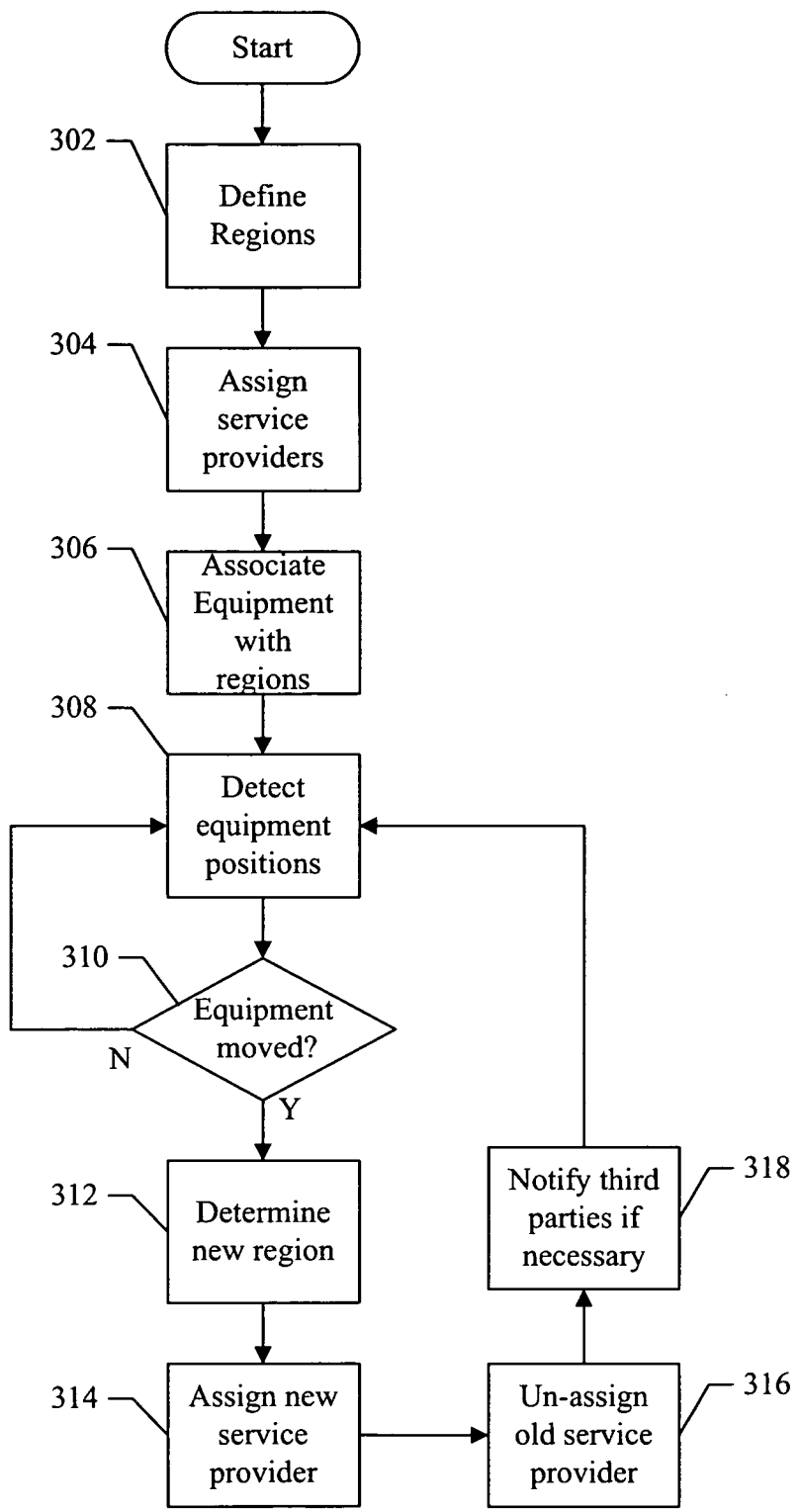
FIG. 3 shows one embodiment of a method for providing a dynamic assignment system.

FIG. 3 shows one embodiment of a method 300 for dynamically assigning regional groups and service and maintenance responsibilities for industrial equipment. For example, the method 300 is suitable for use with one or more embodiments of the hub 200 and dynamic assignment system described herein. In one embodiment, the processing logic 202 executes program instructions to control the hub 200 to perform the functions described below.

At block 302, the method starts by defining service regions within a particular geographic area. For example, the regions may be defined by job sites, lat/long positions, city, county or state boundaries, or any other type of characteristic that may be used to define a regional group. For example, in one embodiment, the processing logic 202 operates to define regions based on a grid of lat/long parameters. The regions are stored in the database 204 for further processing.

At block 304, one or more service and/or maintenance providers are assigned to each region. For example, service and maintenance providers operate to service and maintain the equipment operating in each region. In one embodiment, the processing logic 202 stores the assignments in the database so that the service providers are related to each region defined in the database 204.

At block 306, the equipment operating in each region is associated with its respective regional group and service provider. For example, each piece of equipment transmits its position to the hub 200 via the wireless transceiver 206. The processing logic 202 operates to store equipment identifiers and other equipment information in the database 204 so that the equipment is associated with a particular regional group and one or more service providers.

Each piece of equipment is designated as static or dynamic or both for the purposes of group and service assignments. If a piece of equipment is designated as static, then that piece of equipment will remain associated with a particular regional group no matter where it is moved to. If a piece of equipment is designated as dynamic, then as that piece of equipment is moved from region to region, embodiments of the dynamic assignment system operate to assign regional groups and selected service providers in those regions. If a piece of equipment is designated as both, then it will remain associated with a particular regional group as well as get assigned to the regional group it moved into. For the purposes of this description, it will be assumed that the equipment is designated as dynamic.

At block 308, after the initial associations made at block 306, the equipment report their respective positions to the hub. For example, each piece of equipment may report it position at periodic, random or scheduled times. In another embodiment, the equipment reports its position as the result of a trigger event, such as when the equipment breaks a virtual fence boundary. In one embodiment, the hub 200 receives the equipment positions via the wireless transceiver 206.

At block 310, a test is performed to determine if any of the equipment has moved into a new region. For example, in one embodiment, for each piece of equipment that reports its position, the processing logic 202 compares its reported position with the position stored in the database 204. If the position of the equipment has changed such that it has moved outside of its currently assigned region, then the method proceeds to block 312. If no equipment has moved outside its currently assigned region, then the method proceeds to block 308 and continues to monitor equipment positions.

At block 312, a new region is determined for any piece of equipment that has moved out of its previous region. For example, in one embodiment, the processing logic 202 processing the received position information to determine the region in which the equipment is currently located. The processing logic 202 updates the database 204 to reflect that the equipment is located in a new region by assigning the new regional group and therefore will be serviced and/or maintained by different providers.

At block 314, one or more service providers are assigned to service the equipment at its new location. For example, in one embodiment, the processing logic 202 uses the database 204 to determine one or more service providers to service the equipment at it new location. The processing logic 202 assigns those service providers to provider services to the equipment by transmitting assignment information to those service providers via the network interface 208. It should be noted that more than one service provider might be assigned to provide services for the equipment.

At block 316, the regional group and service providers previously assigned to service the equipment are un-assigned. For example, in one embodiment, the processing logic 202 transmits un-assignment information to the service providers in the region where the equipment was previously located. The un-assignment information indicates to those service providers that they are no longer required to provide services to the equipment.

At block 318, third parties are notified of any assignment changes. For example, the processing logic 202 operates to notify third parties, such as accounting departments, leasing departments, clients, or other by transmitting notification messages via the network interface 208. The method 300 then continues at block 308 where new equipment positions are determined.

It should be noted that the method 300 is just one embodiment and that it is also possible to make minor changes, additions, deletions, combinations, or rearrangements of the method steps all within the scope of the described embodiments.

Therefore, a system to dynamically assign regional groups and service responsibilities for industrial equipment has been described and illustrated herein. Accordingly, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

The invention claimed is:

1. A method for dynamically assigning regional groups and service providers to provide maintenance and repair services for heavy equipment, the method comprising:
   receiving, at a hub apparatus, position information of the heavy equipment, the heavy equipment being previously assigned to a first selected regional group corresponding to a first geographic region and previously assigned to a corresponding first service provider for the maintenance and repair services of the heavy equipment associated with the first selected regional group;
   determining that the heavy equipment has moved from the first geographic region to a second geographic region, based on the position information received from the heavy equipment;
   assigning the heavy equipment to a second selected regional group triggered by the determining step;
   selecting a second service provider to provide the maintenance and repair services for the heavy equipment in the second selected regional group;

assigning the second service provider to provide the maintenance and repair services for the heavy equipment in the second selected regional group; and transmitting, from the hub apparatus and based on the assigning of the second service provider, un-assignment information to the first service provider via a data network, wherein the un-assignment information informs the first service provider that the first service provider is no longer responsible for the maintenance and repair services of the heavy equipment.

2. The method of claim 1, wherein the step of assigning the heavy equipment comprises updating the position information in database.

3. The method of claim 1, wherein the step of selecting comprises selecting the second service provider from a database that relates one or more service providers to the second selected regional group.

4. The method of claim 1, wherein the step of assigning the second service provider comprises transmitting assignment information to the second service provider via the data network.

5. The method of claim 1, wherein the step of assigning the heavy equipment comprises updating regional group un-assignment information in a database.

6. The method of claim 1, further comprising defining one or more regional groups wherein each of the one or more regional groups is associated with one or more service providers for the maintenance and repair services of the heavy equipment.

7. The method of claim 1, further comprising notifying a third party about the selected second regional group and the second service provider for the maintenance and repair services of the heavy equipment.

8. The method of claim 1, further comprising:
determining whether a parameter associated with the heavy equipment indicates that the heavy equipment should be statically or dynamically assigned to a regional group and a service provider; and
wherein performing the assigning of the second selected regional group and the assigning of the second service provider is based on the parameter indicating that the heavy equipment should be dynamically assigned.

9. The method of claim 1, further comprising:
creating a virtual fence around the heavy equipment when the heavy equipment is at a particular location;
wherein receiving the position information further comprises receiving at a first rate when the heavy equipment is within the virtual fence and at a second rate greater than the first rate when the heavy equipment is outside of the virtual fence.

10. The method of claim 1, further comprising:
creating a virtual fence around the heavy equipment when the heavy equipment is at a particular location;
wherein receiving the position information further comprises only receiving when the heavy equipment is outside of the virtual fence.

11. The method of claim 1, further comprising:
creating a virtual fence around the heavy equipment when the heavy equipment is at a particular location;
wherein receiving the position information further comprises receiving when the heavy equipment is moved across the virtual fence; and
receiving status information relating to the heavy equipment when the heavy equipment is moved across the virtual fence.

12. The method of claim 1, wherein receiving the position information further comprises receiving based on a trigger event corresponding to at least one of engine hours, or engine temperature, or oil pressure, each of the heavy equipment.

13. A hub apparatus for dynamically assigning regional groups and service providers to provide maintenance and repair services for heavy equipment, the apparatus comprising:
a transceiver receive position information of the heavy equipment, the heavy equipment being previously assigned to a first selected regional group corresponding to a first geographic region and previously assigned to a corresponding first service provider for the maintenance and repair services of the heavy equipment associated with the first selected regional group;
a processor configured to:
determine that the heavy equipment has moved from a first geographic region to a second geographic region, based on the position information received from the heavy equipment;
assign the heavy equipment to a second selected regional group, triggered by determining that the heavy equipment has moved from the first geographic region to the second geographic region;
select a second service provider to provide the maintenance and repair services for the heavy equipment in the second selected regional group;
assign the second service provider to provide the maintenance and repair services for the heavy equipment in the second selected regional group; and
wherein the transmitter is further configured to transmit, from the hub apparatus and based on the assigning of the second service provider, un-assignment information to the first service provider via a data network, wherein the un-assignment information informs the first service provider that the first service provider is no longer responsible for the maintenance and repair services of the heavy equipment.

14. The apparatus of claim 13, further comprising a database, wherein the processor is further configured to assign the heavy equipment by updating the position information in the database.

15. The apparatus of claim 13, further comprising a database that relates one or more service providers to the selected regional group, wherein the processor is further configured to select the second service provider from the database.

16. The apparatus of claim 13, wherein the processor is further configured to assign the second service provider by transmitting assignment information to the second service provider via the data network.

17. The apparatus of claim 13, further comprising a database, wherein the processor is further configured to update regional group un-assignment information in the database.

18. The apparatus of claim 13, wherein the processor is further configured to define one or more regional groups wherein each of the one or more regional groups is associated with one or more service providers for the maintenance and repair services of the heavy equipment.

19. The apparatus of claim 13, wherein the processor is further configured to notify a third party about the second selected regional group and the second service provider for the maintenance and repair services of the heavy equipment.

20. A hub apparatus for dynamically assigning regional groups and service providers to provide maintenance and repair services for heavy equipment, the apparatus comprising:
means for receiving position information of the heavy equipment, the heavy equipment being previously assigned to a first selected regional group corresponding to a first geographic region and previously assigned to a corresponding first service provider for the maintenance and repair services of the heavy equipment associated with the first selected regional group;

means for determining that the heavy equipment has moved from the first geographic region to a second geographic region, based on the position information received from the heavy equipment;

means for assigning the heavy equipment to a second selected regional group, wherein the means for assigning is triggered by the means for determining that the heavy equipment has moved from the first geographic region to the second geographic region;

means for selecting a second service provider to provide the maintenance and repair services for the heavy equipment in the second selected regional group; and means for assigning the second selected service provider to provide the maintenance and repair services for the heavy equipment in the second selected regional group; and means for transmitting, from the hub apparatus and based on the assigning of the second service provider, un-assignment information to the first service provider via a data network, wherein the un-assignment information informs the first service provider that the first service provider is no longer responsible for the maintenance and repair services of the heavy equipment.

21. The apparatus of claim 20, wherein the means for assigning the heavy equipment comprises means for updating the positional information in a database.

22. The apparatus of claim 20, wherein the means for selecting comprises means for selecting the second service provider from a database that relates one or more service providers to the second selected regional group.

23. The apparatus of claim 20, wherein the means for assigning the second service provider comprises means for transmitting assignment information to the second service provider via the data network.

24. The apparatus of claim 20, wherein the means for assigning the heavy equipment comprises means for updating regional group un-assignment information in a database.

25. The apparatus of claim 20, further comprising means for defining one or more regional groups wherein each of the one or more regional groups is associated with one or more service providers for the maintenance and repair services of the heavy equipment.

26. The apparatus of claim 20, further comprising means for notifying a third party about the second selected regional group and the second service provider.

27. A non-transitory computer program executable by a hub apparatus comprising program instructions for dynamically assigning regional groups and service providers to provide services for heavy equipment, said non-transitory computer program comprising:

program instructions to receive, at the hub apparatus, position information of the heavy equipment, the heavy equipment being previously assigned to a first selected regional group corresponding to a first geographic region and previously assigned to a corresponding first service provider for maintenance and repair services of the heavy equipment associated with the first selected regional group;

program instructions to determine that the heavy equipment has moved from a first geographic region to a second geographic region, based on the position information received from the heavy equipment;

program instructions to assign the heavy equipment to a second selected regional group, wherein the assignment is triggered by the determination that the heavy equipment has moved from a first predetermined geographic region to a second predetermined geographic region;

program instruction to select a second service provider to provide the maintenance and repair services for the heavy equipment in the second selected regional group; and program instructions to assign the second service provider to provide the maintenance and repair services for the heavy equipment in the second selected regional group; and program instructions to transmit, from the hub apparatus and based on the assigning of the second service provider, un-assignment information to the first service provider via a data network, wherein the un-assignment information informs the first service provider that the first service provider is no longer responsible for the maintenance and repair services of the heavy equipment.

28. The non-transitory computer program of claim 27, wherein the program instructions to assign the heavy equipment comprise program instructions for updating the position information in a database.

29. The non-transitory computer program of claim 27, wherein the program instructions to select comprise program instructions for selecting the second service provider from a database that relates one or more service providers for the maintenance and repair services to the selected regional group.

30. The non-transitory computer program of claim 27, wherein the program instructions to assign the second service provider comprise program instructions for transmitting assignment information to the second service provider via the data network.

31. The non-transitory computer program of claim 27, wherein the program instructions to assign the heavy equipment comprise program instructions for updating regional group un-assignment information in a database.

32. The non-transitory computer program of claim 27, further comprising program instructions to define one or more regional groups wherein each of the one or more regional groups is associated with one or more service providers for the maintenance and repair services for the heavy equipment.

33. The non-transitory computer program of claim 27, further comprising program instructions to notify a third party about the second selected regional group and the second service provider for the maintenance and repair services.

* * * * *